(12) United States Patent
Rahman

(10) Patent No.: US 10,119,396 B2
(45) Date of Patent: Nov. 6, 2018

(54) MEASURING BEHIND CASING HYDRAULIC CONDUCTIVITY BETWEEN RESERVOIR LAYERS

(71) Applicant: SAUDI ARABIAN OIL COMPANY, Dhahran (SA)

(72) Inventor: Noor M. Anisur Rahman, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 396 days.

(21) Appl. No.: 14/182,430

(22) Filed: Feb. 18, 2014

(65) Prior Publication Data

US 2015/0233233 A1 Aug. 20, 2015

(51) Int. Cl.
*G01V 9/00* (2006.01)
*E21B 47/00* (2012.01)
*E21B 49/08* (2006.01)

(52) U.S. Cl.
CPC ........ *E21B 49/087* (2013.01); *E21B 47/0005* (2013.01); *G01V 9/00* (2013.01)

(58) Field of Classification Search
CPC ...... E21B 47/102; E21B 49/08; E21B 49/003; E21B 47/06; E21B 47/1025
USPC .......................................................... 702/12
See application file for complete search history.

(56) References Cited

U.S. PATENT DOCUMENTS

| | | |
|---|---|---|
| 3,246,145 A | 4/1966 | Higgins |
| 3,784,828 A | 1/1974 | Hayes |
| 3,892,128 A | 7/1975 | Smith, Jr. |
| 3,905,226 A | 9/1975 | Nicolas |
| 4,028,546 A | 6/1977 | Peelman et al. |

(Continued)

FOREIGN PATENT DOCUMENTS

WO 2011019565 A2 2/2011

OTHER PUBLICATIONS

Bakulin et al., "Acoustic signatures of crossflow behind casing in commingled reservoirs: A case study from Teapot Dome", Geophysics, 2008, pp. 145-152, vol. 73, No. 4, Society of Exploration Geophysicists.

(Continued)

*Primary Examiner* — Stephanie E Bloss
(74) *Attorney, Agent, or Firm* — Bracewell LLP; Constance G. Rhebergen; Christopher L. Drymalla

(57) ABSTRACT

A measure of the hydraulic conductivity, $F_C$, is obtained to characterize the leaky medium behind well casing between adjacent hydrocarbon producing layers is a subsurface reservoir. The value of $F_C$ can be utilized in estimating the rate of flow from a secondary reservoir layer contributing to the total production through the wellbore based on the respective well pressures at a given time. The well pressures are calculated from a model based on the individual properties of and the amounts of fluid produced from these layers. Once there is a reasonable match between the calculated pressures and the measured pressures during a transient test, the parameters that have been used in calculating the model pressures are stored as characteristic parameters of the reservoir system. Such characteristic parameters are utilized in assessing the commercial producibility of the reservoirs.

6 Claims, 4 Drawing Sheets

(56) References Cited

U.S. PATENT DOCUMENTS

| | | | |
|---|---|---|---|
| 4,173,718 A | 11/1979 | Fertl | |
| 4,215,567 A | 8/1980 | Vlcek | |
| 4,353,122 A | 10/1982 | Cubberly, Jr. | |
| 4,475,591 A | 10/1984 | Cooke, Jr. | |
| 4,799,157 A | 1/1989 | Kucuk et al. | |
| 4,803,873 A | 2/1989 | Ehlig-Economides | |
| 4,969,130 A | 11/1990 | Wason et al. | |
| 5,031,467 A | 7/1991 | Rambow | |
| 5,305,209 A | 4/1994 | Stein et al. | |
| 5,509,474 A | 4/1996 | Cooke, Jr. | |
| 5,548,563 A | 8/1996 | Slevinsky | |
| 5,586,082 A | 12/1996 | Anderson et al. | |
| 5,730,219 A | 3/1998 | Tubel et al. | |
| 5,787,050 A | 7/1998 | Slevinsky | |
| 5,803,167 A | 9/1998 | Bussear et al. | |
| 5,829,520 A | 11/1998 | Johnson | |
| 5,975,204 A | 11/1999 | Tubel et al. | |
| 6,840,317 B2 | 1/2005 | Hirsch et al. | |
| 6,898,986 B2 | 5/2005 | Daniel et al. | |
| 6,980,940 B1 | 12/2005 | Gurpinar et al. | |
| 7,089,167 B2 | 8/2006 | Poe | |
| 7,240,568 B2 | 7/2007 | Atkinson | |
| 7,293,471 B2 | 11/2007 | Lund Bo et al. | |
| 7,369,979 B1 | 5/2008 | Spivey | |
| 7,389,185 B2 | 6/2008 | Craig | |
| 7,580,797 B2 | 8/2009 | Akram et al. | |
| 7,708,086 B2 | 5/2010 | Witte | |
| 7,774,140 B2 | 8/2010 | Craig | |
| 8,065,923 B2 | 11/2011 | Duhanyan et al. | |
| 8,244,509 B2 | 8/2012 | Banerjee et al. | |
| 8,275,593 B2 | 9/2012 | Zhao | |
| 8,437,997 B2 | 5/2013 | Meurer et al. | |
| 8,473,268 B2 | 6/2013 | Benish et al. | |
| 8,620,611 B2 | 12/2013 | Ong | |
| 8,620,636 B2 | 12/2013 | Zhan et al. | |
| 8,781,747 B2 | 7/2014 | Ziauddin | |
| 8,793,110 B2 | 7/2014 | Myers et al. | |
| 8,793,112 B2 | 7/2014 | Levitan | |
| 9,068,872 B2 | 6/2015 | Gysling | |
| 9,085,966 B2 | 7/2015 | Rahman | |
| 9,261,869 B2 | 2/2016 | Cheng et al. | |
| 9,367,653 B2 | 6/2016 | Madasu et al. | |
| 9,417,970 B2 | 8/2016 | Fulton et al. | |
| 9,513,241 B2 | 12/2016 | Whittaker | |
| 9,569,521 B2 | 2/2017 | Crafton | |
| 9,617,833 B2 | 4/2017 | Madasu et al. | |
| 9,626,466 B2 | 4/2017 | Yang et al. | |
| 2002/0043370 A1 | 4/2002 | Poe | |
| 2002/0189337 A1* | 12/2002 | Maute | E21B 47/011 73/152.19 |
| 2009/0126475 A1 | 5/2009 | Zhang et al. | |
| 2009/0308601 A1 | 12/2009 | Poe, Jr. et al. | |
| 2010/0082258 A1 | 4/2010 | Wang | |
| 2010/0224361 A1* | 9/2010 | Pope | C09K 8/584 166/250.02 |
| 2011/0015909 A1 | 1/2011 | Zhao | |
| 2011/0040536 A1 | 2/2011 | Levitan | |
| 2011/0191029 A1 | 8/2011 | Jalali et al. | |
| 2012/0018167 A1* | 1/2012 | Konopczynski | E21B 47/102 166/369 |
| 2012/0092690 A1 | 4/2012 | Gaston et al. | |
| 2013/0080128 A1 | 3/2013 | Yang | |
| 2013/0186688 A1* | 7/2013 | Rasmus | E21B 47/06 175/48 |
| 2013/0205886 A1* | 8/2013 | Hegeman | E21B 49/088 73/152.05 |
| 2013/0231867 A1 | 9/2013 | Lin et al. | |
| 2013/0245952 A1 | 9/2013 | Lin et al. | |
| 2013/0255940 A1 | 10/2013 | Rochford et al. | |
| 2014/0083687 A1 | 3/2014 | Poe et al. | |
| 2014/0257775 A1 | 9/2014 | Levitan | |
| 2015/0233233 A1 | 8/2015 | Rahman | |
| 2015/0276970 A1* | 10/2015 | Wu | E21B 47/00 702/7 |
| 2016/0061020 A1 | 3/2016 | Sayarpour | |
| 2016/0177679 A1 | 6/2016 | Zhang et al. | |
| 2016/0178799 A1 | 6/2016 | Sayarpour et al. | |
| 2016/0201452 A1 | 7/2016 | Rahman et al. | |
| 2016/0208599 A1 | 7/2016 | Rahman et al. | |

OTHER PUBLICATIONS

International Search Report and Written Opinion for related PCT application PCT/US2015/015610 dated Jun. 29, 2015.

Ehlig-Economides et al., "Vertical Interference Testing Across a Low-Permeability Zone", SPE Formation Evaluation, 1986, p. 1-18, Society of Petroleum Engineers.

Kremenetskiy et al., "Well-Test Interpretation with Behind-the-Casing Crossflows", SPE Russian Oil & Gas Technical Conference and Exhibition held in Moscow Russia, 2008, pp. 1-12, Society of Petroleum Engineers.

Bourdet, D. "Chapter 1: Principles of Transient Testing" Well Test Analysis: The Use of Advanced Interpretation Models, 2002, pp. 1-23.

Bourdet, D. "Chapter 2: The Analysis Methods" Well Test Analysis: The Use of Advanced Interpretation Models, 2002, pp. 25-46.

Rahman & Bin Akresh "Profiling Pressure-Derivative Values—A New, Innovative Way to Estimate the Radii of Investigation in Heterogeneous Reservoir Systems" SPE 164217, SPE Middle East Oil & Gas Show & Exhibition, Manama, Bahrain, Mar. 10-13, 2013, 12pgs.

Stehfest "Algorithms" Communications of the ACM, vol. 13, No. 1, Jan. 1970, pp. 47-54.

Al-Khalifa et al., "Multiphase Well Test Analysis: Pressure and Pressure-Squared Methods", SPE California Regional Meeting held in Bakersfield, California, 1989, pp. 581-590, SPE 18803.

Al-Mutairi et al., "Fully Integrated Approach Using Temperature Measurements to Describe Complex Reservoirs: Case Study from Saudi Arabia", SPE Annual Technical Conference and Exhibition held in New Orleans Louisiana, 2013, pp. 1-13, SPE 166159.

Anbarchi et al., "Determination of Front Locations in a Multilayer Composite Reservoir", The 64th Annual Technical Conference and Exhibition of the Society of Petroleum Engineers held in Texas, 1989, pp. 285-296, SPE19799.

Cheng-Tai, "Single-Phase Fluid Flow in a Stratified Porous Medium With Crossflow", Society of Petroleum of Engineers Journal, 1984, pp. 97-106, SPE of AIME.

Chu et al., "Pressure Transient Analysis of Two-Phase Flow Problems", SPE Formation Evaluation, 1986, pp. 151-164, Society of Petroleum Engineers.

International Search Report and Written Opinion for related PCT application PCT/US2016/013147 dated Jul. 4, 2016.

International Search Report and Written Opinion for related PCT application PCT/US2016/014260 dated Jun. 13, 2016.

International Search Report and Written Opinion for related PCT application PCTUS2016/016330 dated Jun. 7, 2016.

Partial Search Report for related PCT application PCT/US2016/013147 dated Apr. 26, 2016.

Ehlig-Economides et al., "A New Test for Determination of Individual Layer Properties in a Multilayered Reservoir", SPE Formation Evaluation, 1987, pp. 261-283, SPE14167.

Gao Chengtai, "The Crossflow Behavior and the determination of Reservoir Parameters by Drawdown Tests in Multilayer Reservoirs", Society of Petroleum Engineers, 1983, pp. 1-31, SPE 12580.

Kamal et al., "Pressure Transient Testing Under Multiphase Flow Conditions", SPE Middle East Oil and Gas Show and Conference held in Manama Bahrain, 2011, pp. 1-10, SPE 141572.

Perrine, "Analysis of Pressure-buildup Curves", Presented at the spring meeting of the Pacific Coast District, Division of Production, 1956, pp. 482-509.

Zheng et al., "New Approaches for Analyzing Transient Pressure from Oil and Water Two-Phase Flowing Reservoir", 2009 Kuwait International Petroleum Conference and Exhibition, 2009, pp. 1-25, Society of Petroleum Engineers.

* cited by examiner

ND CASING HYDRAULIC
MEASURING BEHIND CASING HYDRAULIC CONDUCTIVITY BETWEEN RESERVOIR LAYERS

BACKGROUND OF THE INVENTION

1. Field of the Invention

The present invention relates to pressure transient testing of producing hydrocarbon (oil and gas) reservoirs, and more particularly to measuring behind casing hydraulic conductivity between reservoir layers in connection with such pressure transient testing.

2. Description of the Related Art

Pressure transient tests are run on most wells in newly discovered hydrocarbon reservoirs. The results of such tests become a fundamental basis of assessing any future commercial producibility of the hydrocarbon (oil and gas) reservoirs, which includes important details such as economic forecasts based on predicted production rates, reserve assessments and plans for development of infrastructure to produce and transport the hydrocarbons to markets and consumers. During transient tests, both the production rates of fluids at surface and the pressures at downhole conditions are measured with time. Fluid samples are also collected and analyzed later in the laboratory for determining the engineering properties. The test data is analyzed combining with fluid properties to characterize the reservoirs. Such an analysis includes comparing the test data with the predicted or synthetic response of a conceptual model of the actual reservoir. It is important to utilize a realistic model of the reservoir for predicting its future commercial producibility. Hence an appropriate analytical model with two reservoir layers subject to flow behind casing has been incorporated in this invention.

Failure to account for the flow behind the casing may mislead regarding the source of produced fluids and may thus provide unrealistic results from transient tests, where stakes are high. Transient tests provide the characteristic parameters of the reservoir that are acquired under a dynamic condition, which resembles an actual producing condition of a well. That is why, forecasting, having utilized the test results, allows utilization of a realistic downhole condition of the hydrocarbon reservoir at the time of the test.

During pressure transient tests, reservoir permeability and/or mobility, formation damage parameter in terms of skin factors, reservoir pressure, reservoir size and shape, locations of geological features or boundaries are important parameters that are usually determined through such tests. To ascertain accuracy of the reservoir parameters, often individual reservoir layers located at different vertical depths are tested separately. The layers are usually separated by impermeable, non-reservoir strata whose thicknesses can vary from a few inches to few hundred feet.

In evaluating the productive capability of a subsurface reservoir layer, a test known as a transient pressure test is conducted for the layer under investigation. Sometimes the casing is perforated across all available permeable reservoir layers so that fluid from each layer can contribute to the total production through the wellbore, which is usually referred to as "commingled production". For maximizing the hydrocarbon recovery from reservoirs under such a production arrangement, the operator of the oil or gas field needs to know the producibility of individual reservoir layers. Failure to gain this a priori knowledge may cause losing the hydrocarbons from some reservoir layers due to diversion of this fluid from one reservoir layer to another layer instead of flowing towards the wellbore during production or even shut-in. That is why the operator of the field would perform a pressure transient test on one reservoir layer at a time without interfering with any other adjacent reservoir layers. Interfering with the other reservoir layers is probable when any fluid from these layers flows to the layer under investigation or somehow gets produced through the wellbore. Such interference can cause an overestimation of the producibility of the layer under investigation. When the other layers adjacent to the layer under investigation have hydraulic connection to the wellbore through open perforations in the casing, these other layers are blocked from permitting flow from other layers into the casing by what are known as plugs. The annular space between the outside of the well (casing) and the drilled, rugged surface of fluid impermeable rock formation between the layers is filled with cement to, theoretically, block flow and provide zonal isolation between the layers. However, a complete block is sometimes not achieved and this contributes to a condition known as "behind casing flow" between layers.

When the zonal isolation (cement) behind the casing is compromised, the flow behind casing becomes prevalent. If the additional contribution from a layer that is not being tested is not recognized, the reserve estimates and the characterization of the tested reservoir layer can at times be erroneous and misleading.

So far as is known, the effect of possible presence of behind casing flow between layers in the data obtained during pressure transient tests has not been taken into account in the test data for formation layers of interest.

SUMMARY OF THE INVENTION

Briefly, the present invention provides a new and improved computer implemented method of determining a measure of behind casing hydraulic conductivity between formation layers of a subsurface reservoir during a pressure transient test of a first of the reservoir layers. The computer implemented method of the present invention obtains a test measure of well pressure during the pressure transient test of the first layer, and obtains a test pressure derivative of well pressure during the pressure transient test of the first layer. An estimated value of behind casing hydraulic conductivity to the first layer during the pressure transient test of the first layer is determined in the computer, and a postulated wellbore flowing pressure of the formation layers also determined in the computer based on the determined estimated value of behind casing hydraulic conductivity to the first layer. The computer implemented method determines a postulated pressure derivative based on the determined estimated value of behind casing hydraulic conductivity to the first layer, and compares the postulated wellbore flowing pressure with the test measure of well pressure. The computer implemented method also compares the postulated pressure derivative with the test pressure derivative. If the compared postulated measures and test measures match within an acceptable degree of accuracy, the computer implemented method stores the estimated value of behind casing hydraulic conductivity as a measure of behind casing hydraulic conductivity to the first layer during the pressure transient test of the first layer, in addition to the well and the reservoir parameters that have been used in computing the matched postulated measures. If not, the computer implemented adjusts the estimated value of behind casing hydraulic conductivity to the first layer during the pressure transient test of the first layer, and repeats the steps of determining a postulated value of behind casing hydraulic conductivity, determining a postulated pressure derivative and comparing based on the adjusted estimated value of behind casing hydraulic conductivity to the first layer during the pressure transient test of the first layer.

The present invention also provides a new and improved data processing system for determining a measure of behind casing hydraulic conductivity between formation layers of a subsurface reservoir during a pressure transient test of a first of the reservoir layers. The data processing system includes a processor which performs the steps of obtaining a test measure of well pressure during the pressure transient test of the first layer, and obtaining a test pressure derivative of the well pressure at sampled instants of measurement during the pressure transient test of the first layer. The processor also determines an estimated value of behind casing hydraulic conductivity to the first layer during the pressure transient test of the first layer, and determines a postulated wellbore flowing pressure of the formation layers based on the determined estimated value of behind casing hydraulic conductivity to the first layer. The processor further determines a postulated pressure derivative based on the determined estimated value of behind casing hydraulic conductivity to the first layer. The processor compares the postulated wellbore flowing pressure with the test measure of well pressure, and compares the postulated pressure derivative with the test pressure derivative. If the postulated measures and test measures match within an acceptable degree of accuracy, the processor reports the estimated value of behind casing hydraulic conductivity as a measure of behind casing hydraulic conductivity to the first layer during the pressure transient test of the first layer. If not, the processor adjusts the estimated value of behind casing hydraulic conductivity to the first layer during the pressure transient test of the first layer, and repeats the steps of determining a postulated value of behind casing hydraulic conductivity, determining a postulated pressure derivative and comparing based on the adjusted estimated value of behind casing hydraulic conductivity to the first layer during the pressure transient test of the first layer. The data processing system also includes a memory storing the reported measure of behind casing hydraulic conductivity to the first layer during the pressure transient test of the first layer.

The present invention further provides a new and improved data storage device which has stored in a non-transitory computer readable medium computer operable instructions for causing a data processing system to determining a measure of behind casing hydraulic conductivity between formation layers of a subsurface reservoir during a pressure transient test of a first of the reservoir layers. The instructions stored in the data storage device cause the data processing system to perform the steps of obtaining a test measure of well pressure during the pressure transient test of the first layer, and obtain a test pressure derivative of well pressure at sampled instants of measurement during the pressure transient test of the first layer. The instructions stored in the data storage device cause the data processing system to determine an estimated value of behind casing hydraulic conductivity to the first layer during the pressure transient test of the first layer, and determine a postulated wellbore flowing pressure of the formation layers based on the determined estimated value of behind casing hydraulic conductivity to the first layer. The stored instructions also cause the data processing system to determine a postulated pressure derivative based on the determined estimated value of behind casing hydraulic conductivity to the first layer, and to comparing the postulated wellbore flowing pressure with the test measure of well pressure, as well as to compare the postulated pressure derivative with the test pressure derivative. If the postulated measures and test measures match within an acceptable degree of accuracy, the instructions cause the data processing system to store the estimated value of behind casing hydraulic conductivity as a measure of behind casing hydraulic conductivity to the first layer during the pressure transient test of the first layer. If not, the instructions cause the data processing system to adjust the estimated value of behind casing hydraulic conductivity to the first layer during the pressure transient test of the first layer, and repeat the steps of determining a postulated value of behind casing hydraulic conductivity, determining a postulated pressure derivative and comparing based on the adjusted estimated value of behind casing hydraulic conductivity to the first layer during the pressure transient test of the first layer.

DETAILED DESCRIPTION OF THE PREFERRED EMBODIMENTS

Figure 1:
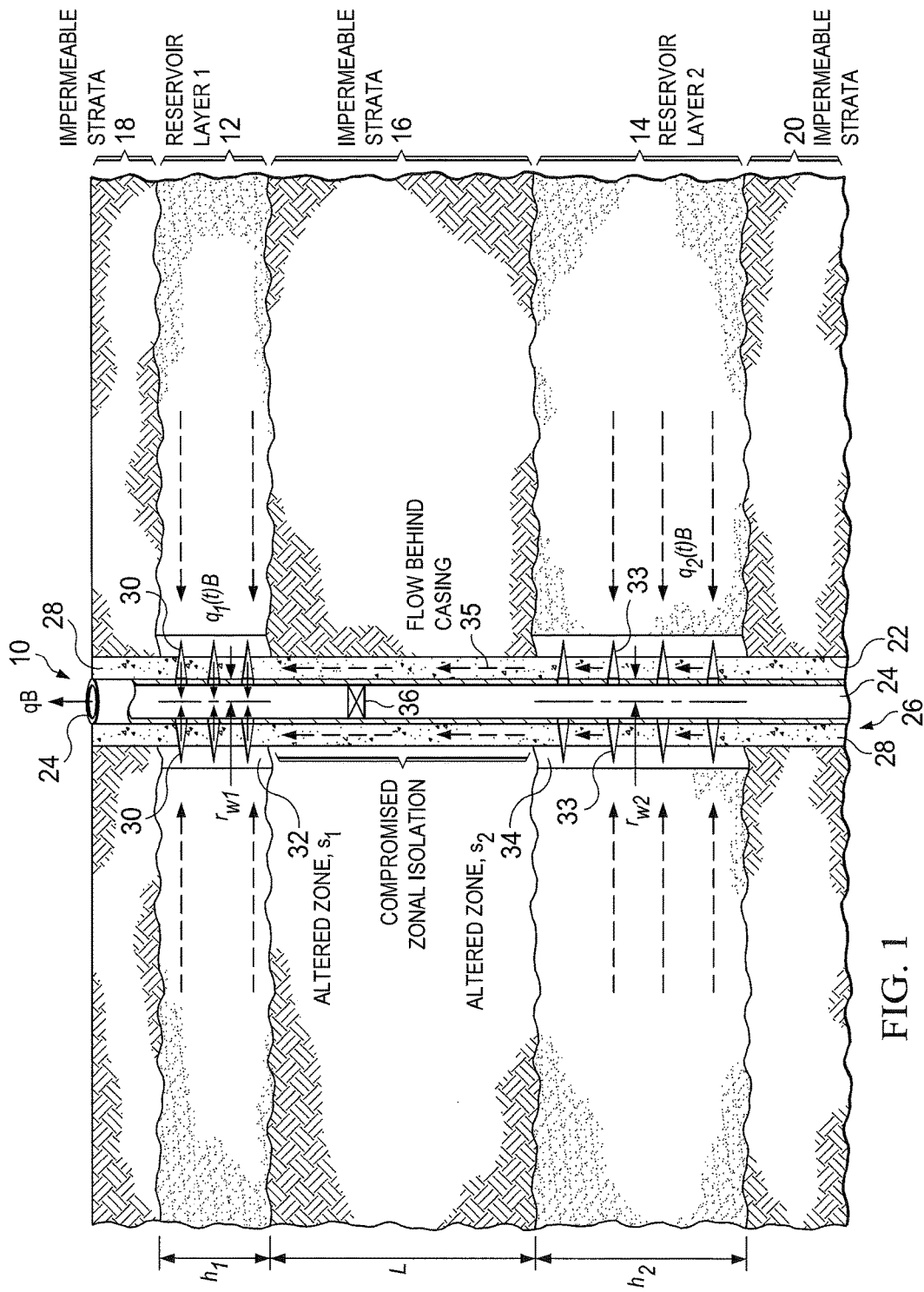
FIG. 1 is a schematic view, taken in cross-section, of a producing well in the earth in flow communication with two fluid producing subsurface reservoir layers.

In the drawings, FIG. 1 represents schematically a cross-sectional view of a hydrocarbon producing well 10 located extending through subsurface earth formations. The well 10 is producing from two layers in the embodiment shown, a first layer 12 (or Reservoir Layer 1) and a second layer 14 (or Reservoir Layer 2). Layers 12 and 14 are separated a distance L (as indicated) from each other by a layer of impermeable strata as shown at 16. There is little possibility that fluid from Reservoir Layer 2 will migrate to Reservoir Layer 1 directly through layer 16, a situation referred to as no probable cross flow in the reservoir. An upper impermeable layer 18 is located above layer 12, and a lower impermeable layer 20 is located below layer 14.

The well 10 is formed by a borehole 22 extending from the earth surface through the layers 12, 14, 16, 18 and 20. As is conventional, a casing 24 is installed in the borehole 22 extending along its length through the well 10. A resultant annulus 26 formed between the casing and the earthen walls of the formation layers adjacent the well is filled by cement 28 which is pumped in to provide zonal isolation between fluid permeable or producing layers 12 and 14. The zonal isolation is intended to stop any flow of fluid behind the casing 24 from layer 14 (Reservoir Layer 2) to layer 12 (Reservoir Layer 1), or vice versa, during production of hydrocarbons from either reservoir layer.

Perforations 30 are formed in the casing 24 and cement 28 adjacent layer 12 forming a resultant altered zone 32 so that hydrocarbon fluids may enter the casing 24 and cement 28 from layer 12 in the radially inward direction at a rate $q_1(t)B$ at a time t. Similarly perforations 33 are formed in the casing 24 and cement 28 adjacent layer 14 forming a resultant altered zone 34 so that hydrocarbon fluids may enter the casing 24 from layer 14 in the radially inward direction at a rate $q_2(t)B$ at a time t. The produced fluids from the layers 12 and 14 represent a composite flow rate of qB in the casing 24.

There are at times for operational reasons situations when the zonal isolation intended by the cement 28 is compromised. Sometimes the perforating operations in Reservoir Layer 1 and/or Layer 2 can weaken the zonal isolation. It is also possible that the cementing job itself cannot succeed due to one or more logistic or operational reasons.

Whenever the zonal isolation is compromised, the fluid for example from layer 14 (Reservoir Layer 2) flows as indicated at 35 in unknown quantities behind the casing 24 towards layer 12 (Reservoir Layer 1), joining the fluid from Reservoir Layer 1 in the altered zone 32, entering the perforations 30 and become produced through the casing 24.

During a pressure transient test of a layer of interest such as layer 12, other layers adjacent to the layer 12 under investigation are blocked from permitting the flow into the casing by what are known as plugs, such as shown at 36. However, to the extent the zonal isolation sought to be achieved by cement permits partial behind the flow of casing from layer 14 to be introduced through perforations into the casing 24, the pressure transient test results reflect this flow as a portion of the flow from layer 12. So far as is known, the presence of this behind the casing flow and its effect on pressure transient test results has not been taken into account. Behind the casing flow thus may arise although the original objective is to produce hydrocarbons only from layer 12 (Reservoir Layer 1) during a transient test.

According to the present invention, a parameter or data measure called "conductivity" indicating the fluid conductivity of the cement 28 in the well annulus 26, denoted by $F_c$, is obtained to quantify the capacity of the cement behind the casing 24 to transmit fluid from Reservoir Layer 2 to Reservoir Layer 1. This hydraulic conductivity $F_c$ in turn helps quantify the rate of fluid flow from Reservoir Layer 2 to Reservoir Layer 1 as illustrated at 35.

Figure 2:
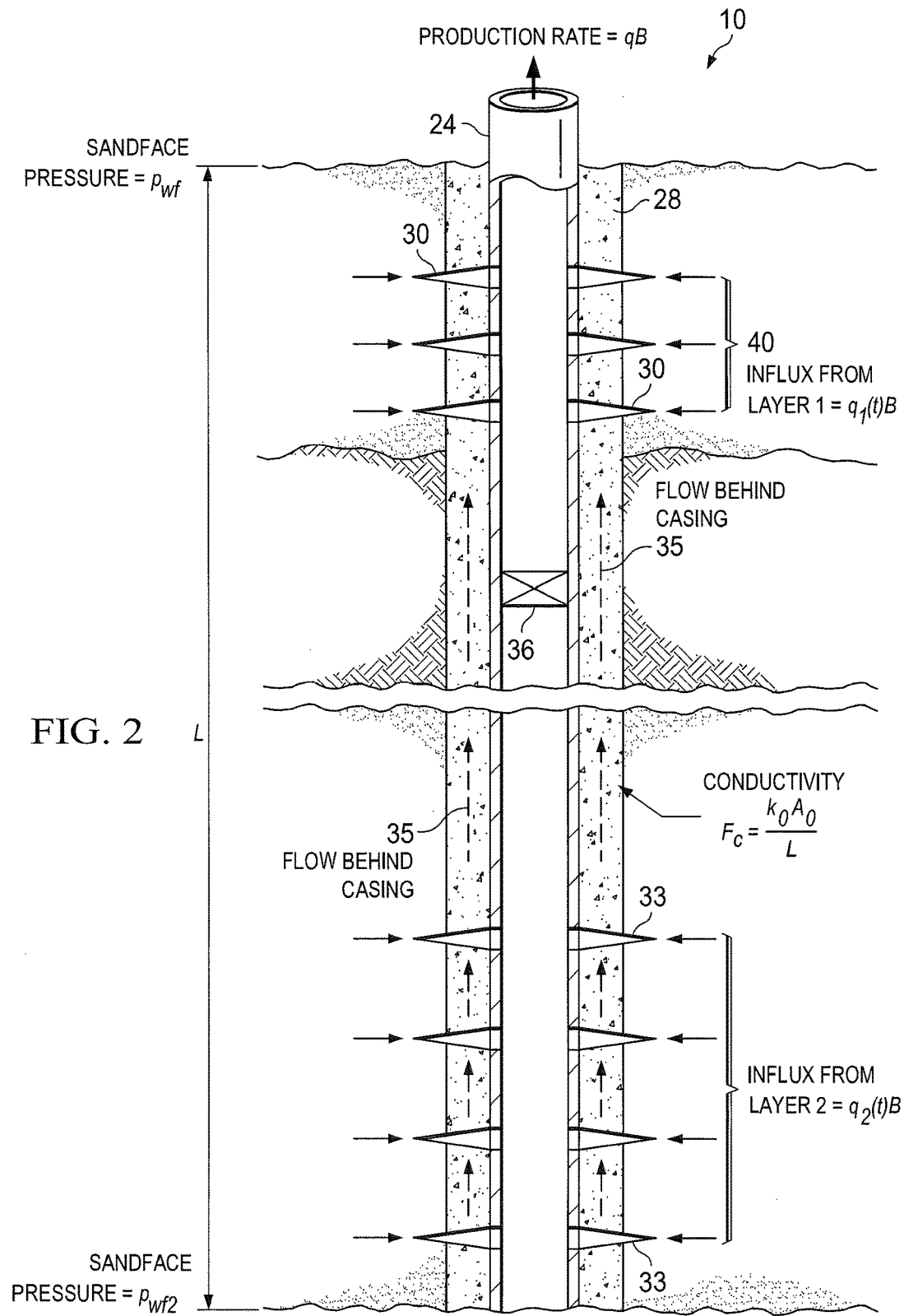
FIG. 2 is a schematic diagram illustrating flow rate and related parameters for flow behind casing between the producing layers of FIG. 1.

As shown in FIG. 2, during a pressure transient test, arrows 40 schematically represent fluid influx from layer 12 at a time rate $q_1(t)B$. As mentioned above, the casing 24 is blocked by plug 36 to prevent flow of fluid which has entered casing 24 through perforations 32 from layer 14. However, the fluid in layer 14 at a sandface pressure $p_{wf2}$ may result in behind the casing flow through cement 28 as indicated by arrows 35 due to fluid conductivity $F_c$ of the cement 28.

The conductivity is defined as $$F_C = \frac{k_0 A_0}{L} \quad (1)$$

The unit of $F_c$ is md·ft, with $k_0$ the average permeability in md of the cement, $A_0$ is the average annular (conductive) area in sq ft of the cement and L is the distance in ft between the layers.

NOMENCLATURE $A_0$ Annular cross sectional area of cement, ft²
B Formation volume factor of produced fluid through wellbore, bbl/STB
$B_1$, $B_2$ Formation volume factor in layer 1 and 2, respectively, bbl/STB
$c_{t1}$, $c_{t2}$ Total system compressibility in layer 1 and 2, respectively, 1/psi
C Wellbore storage constant, bbl/psi
$F_C$ Conductivity of cement behind casing, defined in Equation 1, md·ft
$h_1$, $h_2$ Pay thickness of layer 1 and 2, respectively, ft
$k_0$ Permeability of cement in the annular area behind the casing in the longitudinal direction, md
$k_1$, $k_2$ Permeability in the radial direction of layer 1 and 2, respectively, md
$K_0(\ )$, $K_1(\ )$ Modified Bessel functions of the second kind of orders 0 and 1, respectively
l Laplace transform parameter, 1/hr
L Vertical distance between layer 1 and 2, ft
$p_0$ Initial reservoir pressure, psia
$p_{wf}$ Wellbore flowing pressure (across from layer 1), psia
$p_{wf2}$ Wellbore flowing pressure at sandface across from layer 2, psia
qB Constant rate of production in reservoir conditions from wellbore, bbl/d
$q_1B$, $q_2B$ Rate of production in reservoir conditions from layer 1 and 2, respectively, bbl/d
$r_{we1}$, $r_{we2}$ Equivalent wellbore radius across layer 1 and 2, respectively, ft
$r_{w1}$, $r_{w2}$ Physical wellbore radius across layer 1 and 2, respectively, ft
t Elapsed time, hr
Z Laplace transformation of Z(t), applied in Equations 4, 7, 8, and 9. [Note: Examples of Z are well pressure and individual layer rates which are time-dependent quantities. The Laplace transformation of these time-dependent variables makes it easier to obtain the solution to the problem.]
$\alpha_1$, $\alpha_2$ Flow parameter of layer 1 and 2, $$\frac{k_1 h_1 r_{w1}}{141.2\mu} \text{ and } \frac{k_2 h_2 r_{w2}}{141.2\mu},$$

respectively, md·ft²/cP
$\beta_1$, $\beta_2$ Parameter in layer 1 and 2 md·psia/cP
$\varphi_1$, $\varphi_2$ Porosity of layer 1 and 2, respectively, fraction
$\eta_1$, $\eta_2$ Hydraulic diffusivity of layer 1 and 2, $$\frac{0.0002637 \, k_1}{\varphi_1 \mu c_{t1}} \text{ and } \frac{0.0002637 \, k_2}{\varphi_2 \mu c_{t2}},$$

respectively, md·psia/cP
µ Viscosity of fluid, cP

The rates are considered at reservoir conditions (so the rate at the surface condition, q, is multiplied by the formation volume factor of produced fluid, B). For a constant rate of production through the casing at the reservoir conditions, qB, the contributions from both layers can be time-dependent, as denoted by $q_1(t)B$ and $q_2(t)B$, respectively. Subscripts 1 and 2 refer to Reservoir Layer 1 and 2, respectively.

With the present invention, an analytical modeling methodology is provided, based on measures of flow rate, pressure and time obtained during pressure transient testing, and well and layer measured data and parameters to determine $F_c$ which represents the fluid conductivity of the cement 28 in the well annulus 26 between adjacent fluid permeable layers in well 10. It is to be noted that the physical relationships expressed in the equations presented below are in the system of US Oilfield units, and any conversion to another system of units is readily achieved.

The relationships expressed include the effects of wellbore storage and skin factors of individual layers. The pressures considered in this invention are also corrected to a datum depth, and the rates are at the reservoir conditions. The storage constant, C, in bbl/psi, takes care of the phenomenon, while skin factors are considered through the respective effective wellbore radii, $r_{we1}$ and $r_{we2}$, having actual wellbore radii of $r_{w1}$ and $r_{w2}$ and skin factors, $s_1$ and $s_2$, respectively as $$r_{we1} = r_{w1}\exp(-s_1) \qquad (2)$$

$$r_{we2} = r_{w2}\exp(-s_2) \qquad (3)$$

Set forth below are the major working equations of the analytical model which are used in calculating pressures and rates of production from individual layers. The Laplace transforms have been performed on the quantities which are time-dependent. Note that the pressure and the rate equations are derived from the model and presented in the Laplace domain. So the values of these equations need to be inverted back to the time domain, preferably with the Stehfest algorithm, as described in Stehfest, H., 1970, Algorithm 368: Numerical Inversion of Laplace Transforms. Communications of ACM 13(1): 47-49. Those skilled in the art should be able to perform these operations without any difficulty.

Well pressure at tested layer (Reservoir Layer 1): (4)

$$\overline{p}_{wf} = \frac{p_0}{l} \frac{qB}{\left[l\left[24Cl + \frac{\alpha_1\sqrt{\frac{l}{\eta_1}}K_1\left(r_{w1}\sqrt{\frac{l}{\eta_1}}\right)}{K_0\left(r_{we1}\sqrt{\frac{l}{\eta_1}}\right)} + \frac{\alpha_2\sqrt{\frac{l}{\eta_2}}K_1\left(r_{w2}\sqrt{\frac{l}{\eta_2}}\right)}{K_0\left(r_{we2}\sqrt{\frac{l}{\eta_2}}\right) + \frac{282.4\pi\mu\alpha_2}{F_C}\sqrt{\frac{l}{\eta_2}}K_1\left(r_{w2}\sqrt{\frac{l}{\eta_2}}\right)}\right]\right]}$$

Parameters for subsequent calculations (5)

$$\beta_1 = \frac{\overline{p}_{wf} - \frac{p_0}{l}}{K_0\left(r_{we1}\sqrt{\frac{l}{\eta_1}}\right)}$$

$$\beta_2 = \frac{\overline{p}_{wf} - \frac{p_0}{l}}{K_0\left(r_{we2}\sqrt{\frac{l}{\eta_2}}\right) + \frac{282.4\pi\mu\alpha_2}{F_C}\sqrt{\frac{l}{\eta_2}}K_1\left(r_{w2}\sqrt{\frac{l}{\eta_2}}\right)} \qquad (6)$$

Well pressure at Reservoir Layer 2: (7)

$$\overline{p}_{wf2} = \frac{p_0}{l} + \beta_2 K_0\left(r_{we2}\sqrt{\frac{l}{\eta_2}}\right)$$

Rates of production from individual layers: (8)

$$\overline{q_1 B} = -\alpha_1\beta_1\sqrt{\frac{l}{\eta_1}}K_1\left(r_{w1}\sqrt{\frac{l}{\eta_1}}\right)$$

$$\overline{q_2 B} = -\alpha_2\beta_2\sqrt{\frac{l}{\eta_2}}K_1\left(r_{w2}\sqrt{\frac{l}{\eta_2}}\right) \qquad (9)$$

It is to be noted that computations of $p_{wf}$, $p_{wf2}$, $q_1B$ and $q_2B$, using Equations (4), (7), (8) and (9), respectively, require employing the Stehfest algorithm (1970). Once the wellbore pressure, $p_{wf}$, has been calculated from Equation (4) through the Stehfest algorithm, this value of wellbore pressure is used to calculate the corresponding pressure derivative $$\left(t\frac{dp_{wf}}{dt}\right),$$

which is also known as the semi-log or well-test derivative. A suitable technique for determining the corresponding pressure derivative is that described by Rahman and BinAkresh (2013, Paper SPE 164217 Profiling Pressure-Derivative Values).

Further, although all the equations and the procedure are presented for the drawdown cases (when the well is in production), these are equally valid for the buildup cases (when the well is shut in following a period of production) as well, through the use of the known principle of superposition, commonly utilized by those skilled in the art in the petroleum industry.

Figure 3:
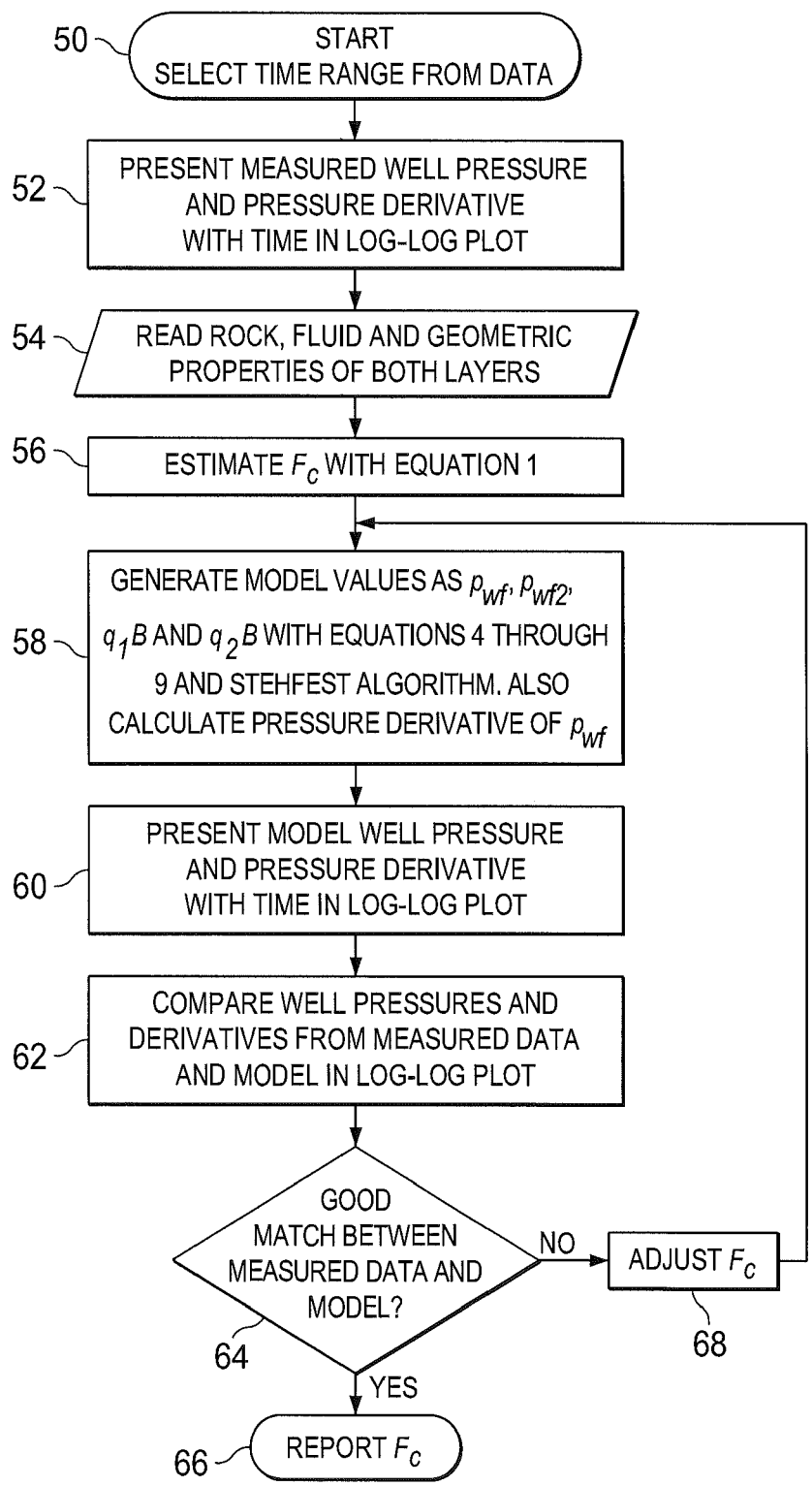
FIG. 3 is a functional block diagram of a flow chart of data processing steps for a scalable parallel method and system for measuring behind casing hydraulic conductivity between reservoir layers according to the present invention.

A computer implemented process of determining well pressures, pressure derivative and rates from the above model and of estimating of cement conductivity, $F_C$, from transient-test data through an iterative scheme is illustrated schematically a flow chart F in FIG. 3.

The flow chart F (FIG. 3) illustrates the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program code elements in a form that instructs a digital processing apparatus (that is, a computer) to perform a sequence of data transformation or processing steps corresponding to those shown.

FIG. 3 illustrates schematically a preferred sequence of steps of a process for analyzing a subsurface reservoir of interest to determine measures of fluid conductivity $F_c$ representing the capacity of the cement 28 to allow the flow of fluid to a layer such as layer 12 being pressure transient tested from other adjacent producing layers which were intended to be in zonal isolation from the layer being tested.

As shown at step 50, processing according to the present invention begins with a time range being selected from the pressure and time data obtained during pressure transient test of a layer of interest such as layer 12 (Reservoir Layer 1). During step 52, the measured well pressure $p_{wf}$ and pressure derivative $$\left(t\frac{dp_{wf}}{dt}\right)$$

are formatted in a form for storage and subsequent display in log-log plots, and are available for output display by data processing system D (FIG. 4) in such format.

During step 54, the rock, fluid and geometric properties of the layers 10 and 12, as well as the casing, annulus and other formation properties are read in form the input data. During step 56, an initial measure or estimate of the fluid conductivity $F_c$ of the cement 28 between the layers 12 and 14 is determined based on the relationship expressed in Equation (1) based on the input data.

During step 58, model values of well flowing pressure $p_{wf}$, well flowing pressure $p_{wf2}$ from layer 14, rate of production in reservoir conditions $q_1B$ from layer 12 and rate of production in reservoir conditions $q_2B$ from layer 14 are determined using the methodology described with Equations (4) through (9) and the Stehfest algorithm mentioned above. The pressure derivative $$\left(t\frac{dp_{wf}}{dt}\right)$$

of the measured well pressure $p_{wf}$ is also determined during step 58. The data values determined during step 58 are formatted in a form for storage and subsequent display in log-log plots, and are available in that format for output display as indicated at step 60 by data processing system D.

During step 62, the model values of measured well pressure $p_{wf}$ and the corresponding pressure derivative $$\left(t\frac{dp_{wf}}{dt}\right)$$

determined during step 58 are compared with the model values obtained during step 52. If the values compared in step 62 indicate that the model values being compared correspond within a specified acceptable degree of accuracy as indicated by step 64, an acceptable value of fluid conductivity $F_c$ of the cement 28 between the layers 12 and 14 is indicated as represented at step 66 as having been determined. If the results of step 64 indicate an unacceptable accuracy between the model values being compared, the value of fluid conductivity $F_c$ is adjusted during step 68 and processing returns to step 58 for processing based on the adjusted value of $F_c$. Processing continues for further iterations until during step 64 an acceptable value of fluid conductivity $F_c$ of the cement 28 is indicated.

Figure 4:
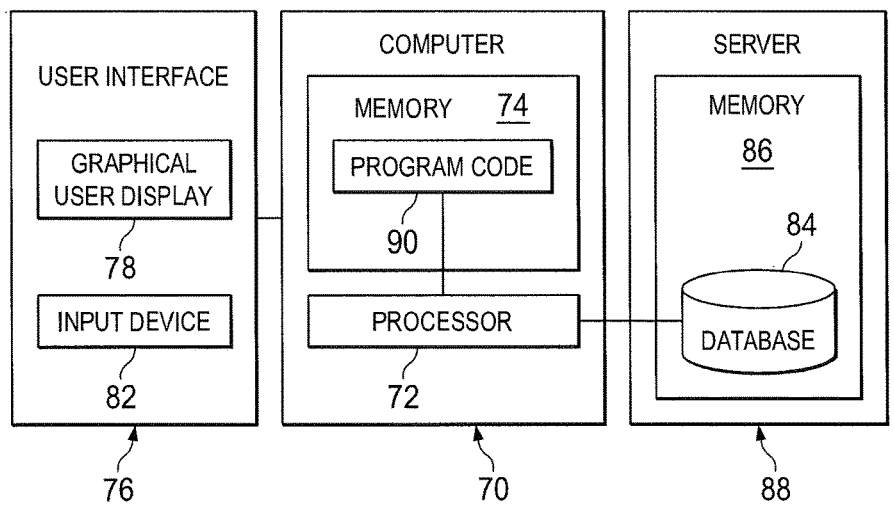
FIG. 4 is a schematic diagram of a data processing system for measuring behind casing hydraulic conductivity between reservoir layers according to the present invention.

As illustrated in FIG. 4, the data processing system D includes a computer 70 having a processor 72 and memory 74 coupled to the processor 72 to store operating instructions, control information and database records therein. The data processing system D may be a multicore processor with nodes such as those from Intel Corporation or Advanced Micro Devices (AMD), an HPC Linux cluster computer or a mainframe computer of any conventional type of suitable processing capacity such as those available from International Business Machines (IBM) of Armonk, N.Y. or other source. The data processing system D may also be a computer of any conventional type of suitable processing capacity, such as a personal computer, laptop computer, or any other suitable processing apparatus. It should thus be understood that a number of commercially available data processing systems and types of computers may be used for this purpose.

The processor 72 is, however, typically in the form of a personal computer having a user interface 76 and an output display 78 for displaying output data or records of processing of force measurements performed according to the present invention. The output display 78 includes components such as a printer and an output display screen capable of providing printed output information or visible displays in the form of graphs, data sheets, graphical images, data plots and the like as output records or images.

The user interface 76 of computer 70 also includes a suitable user input device or input/output control unit 82 to provide a user access to control or access information and database records and operate the computer 70.

Data processing system D further includes a database 84 stored in memory, which may be internal memory 74, or an external, networked, or non-networked memory as indicated at 86 in an associated database server 88. The database 86 also contains various data including the time and pressure data obtained during pressure transient testing of the layer under analysis, as well as the rock, fluid and geometric properties of layers 10 and 12, and the casing, annulus and other formation properties, physical constants, parameters, data measurements identified above with respect to FIGS. 1 and 2 and the Nomenclature table.

The data processing system D includes program code 90 stored in a data storage device, such as memory 74 of the computer 70. The program code 90, according to the present invention is in the form of computer operable instructions causing the data processor 72 to perform the methodology of determining measures of fluid conductivity $F_c$ representing the capacity of the cement 28 to allow the flow of fluid to the layer 12 being pressure transient tested from other adjacent producing layers which were intended to be in zonal isolation from the layer being tested.

It should be noted that program code 90 may be in the form of microcode, programs, routines, or symbolic computer operable languages that provide a specific set of ordered operations that control the functioning of the data processing system D and direct its operation. The instructions of program code 90 may be may be stored in non-transitory memory 74 of the computer 70, or on computer diskette, magnetic tape, conventional hard disk drive, electronic read-only memory, optical storage device, or other appropriate data storage device having a computer usable medium stored thereon. Program code 90 may also be contained on a data storage device such as server 88 as a non-transitory computer readable medium, as shown.

Figure 5:
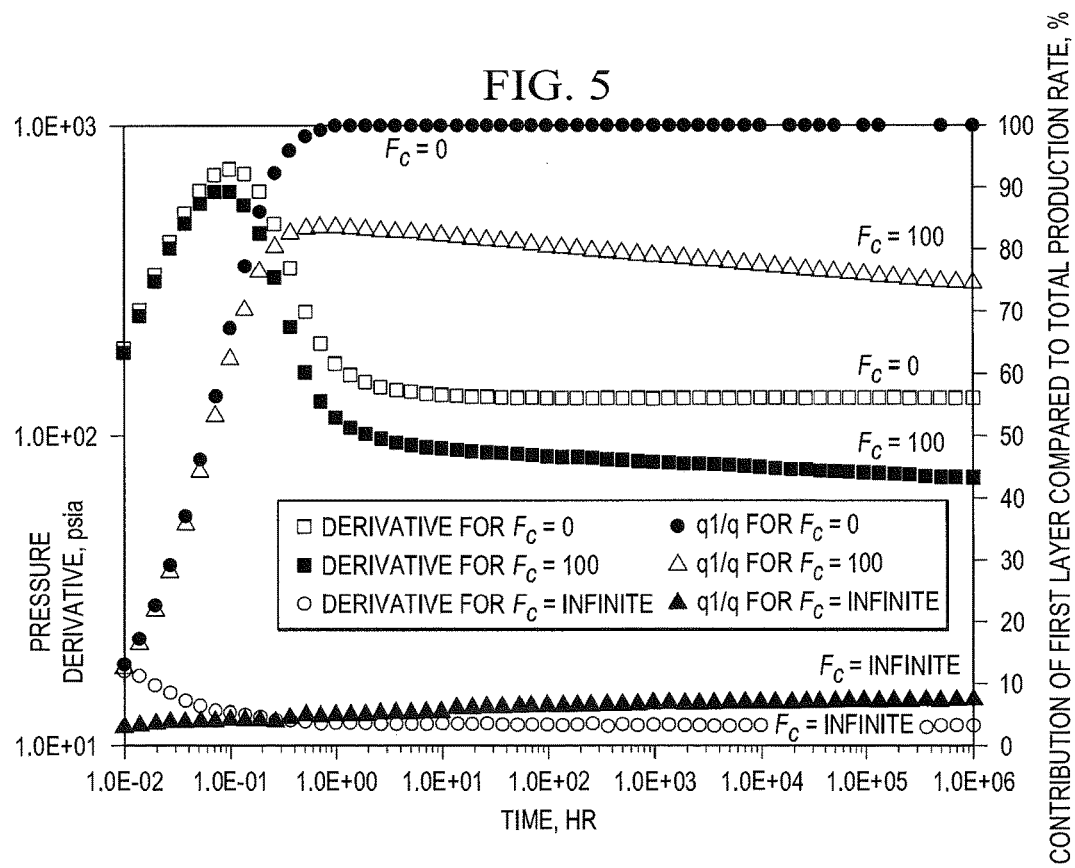
FIG. 5 is an example plot of data obtained during measuring behind casing hydraulic conductivity between reservoir layers according to the present invention.

The processor 72 of the computer 70 accesses the pressure transient testing data and other input data measurements as described above to perform the logic of the present invention, which may be executed by the processor 72 as a series of computer-executable instructions. The stored computer operable instructions cause the data processor computer 70 to determine measures of fluid conductivity $F_c$ in the manner described above and shown in FIG. 3. Results of such processing are then available on output display 78. FIG. 5 is an example display of such result.

Using the methodology described above, diagnostic plots can be generated to ascertain if any flow behind the casing is going on. FIG. 5 presents a diagnostic plot which shows the effects of the cement conductivity, $F_c$, on the pressure derivative and on the relative contribution of the first reservoir layer, expressed as a ratio of $q_1/q$. This means that the value of $F_c$ dictates how the pressure derivative and the relative contribution of the first layer will vary with time.

The output display of FIG. 5 shows well pressures in layers, pressure derivative in the first layer, rates of production of both layers and their relative contribution in comparison to the total rate of production. These quantities are presented as a function of time. The pressure-derivative and time axes are presented on logarithmic scales, which is normal in the industry. Relative rate contributions of both layers are presented on a linear, vertical scale on the righthand side. The petrophysical, reservoir and fluid properties that have been input to the model are listed in Table 1.

TABLE 1

| Layer 1 | Layer 2 | Fluid | Well |
|---|---|---|---|
| $k_1$ = 6 md | $k_2$ = 900 md | $\mu$ = 0.5 cP | C = 0.005 bbl/psi |
| $\varphi_1$ = 0.2 | $\varphi_2$ = 0.2 | | |
| $h_1$ = 105 ft | $h_2$ = 15 ft | | q = 1,030 STB/d |
| $B_1$ = 1.3 bbl/STB | $B_2$ = 1.3 bbl/STB | | |
| $c_{t1}$ = 1.0e−5/psi | $c_{t2}$ = 1.0e−5/psi | | |
| $s_1$ = −1.7 | $s_2$ = −0.5 | | Fc = 50 md · ft |
| $r_{w1}$ = 0.25 ft | $r_{w2}$ = 0.25 ft | | |

In this case, the effect of wellbore storage is apparent over a steep change in the $q_1/q$ profile up to 0.5 hr. A zero value to $F_c$ means that the second layer 14 is isolated and only the first layer 12 can contribute to production. However, some portion of the early time shows that the wellbore storage has provided production before the first layer can contribute 100% for $F_c$=0 md·ft. Also a case with $F_c$ having an infinite value is presented, which means the both reservoir layers are contributing through commingling at the wellbore.

Thus, the case of $F_c$=0 md·ft and the case of $F_c$ having an infinite value constitute the two possible extreme cases of the cement conductivity. The most practical cases will probably show values in between the two extreme cases. Diagnostic plots as FIG. 5 can be constructed from the model to match the actual data (well pressure and its derivative) from transient-pressure tests.

As shown in FIG. 5, for the two extreme cases the derivative profiles are parallel to the time axis at later time (after few hours of flow). But for a non-zero value of the cement conductivity (here with 100 md·ft), the derivative profile is slanted towards the one for an infinite value. Although this is an important observation, the real tests are usually run over time spans on the order of 100 hours and the recognition of the steepness of the derivative profile may not be easy to detect. One observes that the location of the derivative profile in a situation with the flow behind casing lies somewhere between the two extreme cases. This is the hallmark signature of any flow behind casing.

The invention has been sufficiently described so that a person with average knowledge in the field of reservoir modeling and simulation may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there can be improvements and modifications made of the present invention described in detail above without departing from the spirit or scope of the invention as set forth in the accompanying claims.

What is claimed is:

1. In pressure transient testing a first formation layer of a subsurface reservoir to evaluate productive capability of the first formation layer, a method of forming a measure of the rate of flow from a second formation layer through well casing cement in an annulus between a well casing and borehole walls of the subsurface reservoir between the first and second formation layers comprising:

conducting a pressure transient test of the first formation layer to obtain pressure test data for the first formation layer, the pressure transient test of the first formation layer comprising physically blocking casing flow of fluid from the second formation layer, the pressure test data for the first formation layer comprising time and well pressure measurements acquired during the pressure transient test of the first formation layer;

obtaining rock, fluid and geometric properties of the plurality of the formation layers;

determining, from the pressure test data for the first formation layer, a first test wellbore flowing pressure at a first time during the pressure transient test of the first formation layer;

determining, using the pressure data for the first formation layer, a first test pressure derivative of wellbore flowing pressure corresponding to a pressure derivative of the wellbore flowing pressure during the pressure transient test of the first formation layer;

determining, using the rock, fluid and geometric properties of the plurality of the formation layers, a first estimated behind casing hydraulic conductivity corresponding to behind the casing flow of fluid to the first formation layer during the pressure transient test of the first formation layer;

determining, based on the estimated behind casing hydraulic conductivity, a first postulated wellbore flowing pressure corresponding to a wellbore flowing pressure of the second formation layer;

determining, based on the estimated behind casing hydraulic conductivity, a postulated pressure derivative;

determining that the first postulated wellbore flowing pressure matches the first test wellbore flowing pressure and the postulated pressure derivative matches the first test pressure derivative of wellbore flowing pressure; and in response to determining that the first postulated wellbore flowing pressure matches the first test wellbore flowing pressure and the postulated pressure derivative matches the first test pressure derivative of wellbore flowing pressure:

storing the estimated behind casing hydraulic conductivity as a measure of the capacity of the cement in the annulus between the well casing and borehole walls between the first and second formation layers to transmit fluid to the first formation layer during the pressure transient test of the first formation layer; and forming the measure of the rate of flow from the second formation layer through well casing cement in the annulus between the well casing and the borehole walls of the subsurface reservoir between the first and second formation layers based on the measure of the capacity of the cement in the annulus between the well casing and borehole walls of the subsurface reservoir to transmit fluid to the first formation layer during the pressure transient test of the first formation layer.

2. The method of claim 1, wherein the pressure transient test is performed during well drawdown.

3. The method of claim 1, wherein the pressure transient test is performed during well buildup.

4. The method of claim 1 further comprising:

determining a second postulated wellbore flowing pressure and a second postulated pressure derivative;

determining that the second postulated wellbore flowing pressure does not match the first test wellbore flowing pressure or the second postulated pressure derivative does not match the first test pressure derivative of wellbore flowing pressure; and in response to determining that the second postulated wellbore flowing pressure does not match the first test wellbore flowing pressure or the second postulated pressure derivative does not match the first test pressure derivative of wellbore flowing pressure:

adjusting the estimated behind casing hydraulic conductivity to generate an adjusted estimated behind casing hydraulic conductivity;

determining, using the adjusted estimated behind casing hydraulic conductivity, a third postulated value of behind casing hydraulic conductivity and a third postulated pressure derivative, and determining whether the third postulated wellbore flowing pressure matches the first test wellbore flowing pressure and the third postulated pressure derivative matches the first test pressure derivative of wellbore flowing pressure; and in response to determining that the third postulated wellbore flowing pressure matches the first test wellbore flowing pressure and the third postulated pressure derivative matches the first test pressure derivative of wellbore flowing pressure:

storing the adjusted estimated behind casing hydraulic conductivity as the measure of the capacity of the cement in the annulus between the well casing and borehole walls between the first and second formation layers to transmit fluid to the first formation layer during the pressure transient test of the first formation layer; and forming the measure of the rate of flow from the second formation layer through well casing cement in the annulus between the well casing and the borehole walls of the subsurface reservoir between the first and second formation layers based on the measure of the capacity of the cement in the annulus between the well casing and borehole walls of the subsurface reservoir to transmit fluid to the first formation layer during the pressure transient test of the first formation layer.

5. A system for forming a measure of the rate of flow from a second formation layer of a subsurface reservoir through well casing cement in an annulus between a well casing and borehole walls of the subsurface reservoir between a first formation layer and a second formation layer for use in evaluating productive capability of the first formation layer, the system configured to:

conduct a pressure transient test of the first formation layer to obtain pressure test data for the first formation layer, the pressure transient test of the first formation layer comprising physically blocking casing flow of fluid from the second formation layer, the pressure test data for the first formation layer comprising time and well pressure measurements acquired during the pressure transient test of the first formation layer;

obtain rock, fluid and geometric properties of the plurality of the formation layers;

determine, from the pressure test data for the first formation layer, a first test wellbore flowing pressure at a first time during the pressure transient test of the first formation layer;

determine, using the pressure data for the first formation layer, a first test pressure derivative of wellbore flowing pressure corresponding to a pressure derivative of the wellbore flowing pressure during the pressure transient test of the first formation layer, determine, using the rock, fluid and geometric properties of the plurality of the formation layers, a first estimated behind casing hydraulic conductivity corresponding to behind the casing flow of fluid to the first formation layer during the pressure transient test of the first formation layer;

determine, based on the estimated behind casing hydraulic conductivity, a first postulated wellbore flowing pressure corresponding to a wellbore flowing pressure of the second formation layer;

determine, based on the estimated behind casing hydraulic conductivity, a first postulated pressure derivative;

determine that the first postulated wellbore flowing pressure matches the first test wellbore flowing pressure and the first postulated pressure derivative matches the first test pressure derivative of wellbore flowing pressure; and in response to determining that the first postulated wellbore flowing pressure matches the first test wellbore flowing pressure and the first postulated pressure derivative matches the first test pressure derivative of wellbore flowing pressure:

store the estimated behind casing hydraulic conductivity as a measure of the capacity of the cement in the annulus between the well casing and borehole walls between the first and second formation layers to transmit fluid to the first formation layer during the pressure transient test of the first formation layer; and form the measure of the rate of flow from the second formation layer through well casing cement in the annulus between the well casing and the borehole walls of the subsurface reservoir between the first and second formation layers based on the measure of the capacity of the cement in the annulus between the well casing and borehole walls of the subsurface reservoir to transmit fluid to the first formation layer during the pressure transient test of the first formation layer.

6. The system of claim 5 further configured to:

determine that the first postulated wellbore flowing pressure does not match the first test wellbore flowing pressure or the first postulated pressure derivative does not match the first test pressure derivative of wellbore flowing pressure; and in response to determining that the first postulated wellbore flowing pressure does not match the first test wellbore flowing pressure or the first postulated pressure derivative does not match the first test pressure derivative of wellbore flowing pressure:

adjust the estimated behind casing hydraulic conductivity to generate an adjusted estimated behind casing hydraulic conductivity;

determine, using the adjusted estimated behind casing hydraulic conductivity, a second postulated value of behind casing hydraulic conductivity and a second postulated pressure derivative;

determine that the second postulated wellbore flowing pressure matches the first test wellbore flowing pressure and the second postulated pressure derivative matches the first test pressure derivative of wellbore flowing pressure; and in response to determining that the second postulated wellbore flowing pressure matches the first test wellbore flowing pressure and the second postulated pressure derivative matches the first test pressure derivative of wellbore flowing pressure:

store the adjusted estimated behind casing hydraulic conductivity as the measure of the capacity of the cement in the annulus between the well casing and borehole walls between the first and second formation layers to transmit fluid to the first formation layer during the pressure transient test of the first formation layer; and form the measure of the rate of flow from the second formation layer through well casing cement in the annulus between the well casing and the borehole walls of the subsurface reservoir between the first and second formation layers based on the measure of the capacity of the cement in the annulus between the well casing and borehole walls of the subsurface reservoir to transmit fluid to the first formation layer during the pressure transient test of the first formation layer.

\* \* \* \* \*